United States Patent Office 3,323,869
Patented June 6, 1967

---

3,323,869
PROCESS FOR PRODUCING EXPANDED GRAPHITE
Franciszek Olstowski, Freeport, Tex., assignor to The Dow Chemical Company, Midland, Mich., a corporation of Delaware
No Drawing. Filed Dec. 19, 1963, Ser. No. 331,918
5 Claims. (Cl. 23—209.1)

This invention relates to a process for preparing expanded graphite and more particularly is concerned with a novel process for preparing expanded graphite of a low bulk density at relatively low expansion temperatures. The loose, low bulk density, vermicular (worm-like) expanded graphite produced by the present process can be used, for example, as a sound proofing medium, a fire stop in partition walls or floor channels, a low density filler for flotation gear, a packaging and/or cushioning medium and a filtration aid for separating finely divided solids suspended in a liquid.

It is a principal object of the present invention to provide a novel process for preparing an expanded graphite of low bulk density employing relatively low expansion temperatures.

It is another object of the present invention to provide a novel process for preparing expanded graphite of low bulk density that does not require the use of hard to handle concentrated or fuming oxy-acids.

It is an additional object of the present invention to provide an economical novel electrochemical method for preparing expanded graphite of low bulk density.

Other objects and advantages readily will become apparent from the detailed description presented hereinafter when read in conjunction with the appended claims.

The present novel process comprises anodically electrolyzing natural crystalline lump or natural crystalline flake graphite in an aqueous electrolyte and heating the so-treated graphite at a minimum temperature of at least about 150° C.

More particularly the present process comprises anodically electrolyzing a natural crystalline flake graphite or natural crystalline lump graphite in an aqueous acidic or aqueous salt electrolyte at an electrolyte temperature of from about 0 to about 80° C., preferably from about 20 to about 50° C., at a cell potential at a minimum of about 2 volts. Ordinarily for most efficient economical operation a maximum of about 10 volts is employed in the cell. The quantity of electricity passed is equivalent to from about 10 to about 500 ampere-hours per pound of graphite, and preferably from about 20 to about 200 ampere-hours per pound of graphite.

The electrolytically treated graphite is separated from the electrolyte solution and heated at a temperature of from about 150° C. to about 1500° C., or higher and preferably at a temperature of from about 200° C. to about 1000° C. for a period of from less than about 1 second to about 30 seconds or more. The electrolytically treated graphite material can be placed in a suitable reactor or crucible, for example, and subjected to an elevated temperatuer as produced by an exterior heat source or furnace to achieve the expansion. Direct contact of the treated material with the flame of a propane-air torch or an oxyacetylene torch, for example, also yields the desired product.

An unexpected advantage of the present process is that the apparent bulk density of the resulting expanded product can be predetermined to a considerable extent by the total amount of electrolysis and/or the temperature of expansion.

As the total amount of current increases over the range set forth herein the apparent bulk density in the expanded product decreases. Further, as the temperature of expansion increases over the operable range, the apparent bulk density of the expanded graphite product decreases.

The graphite can be expanded in free form, or can be incorporated into various inorganic and organic materials prior to expansion for the purposes of imparting special characteristics to these media. To illustrate, light-weight flame retardant and/or self-extinguishing compositions can be prepared. Also, light weight compositions having excellent thermal insulating properties and electrical conductivity can be fabricated. Improved refractory and construction units also can be achieved by use of the expanded graphic produced by the present process. The expanded product also finds utility in the formulation of explosives. In some applications, the electrolyzed graphite can be incorporated into other media in the unexpanded form and then be expanded in situ during processing and fabrication.

Graphites suitable for use in the present process are the naturally occurring crystalline flake graphites, as from layered metamorphose rock deposits of Madagascar, and crystalline lump graphites, as from vein deposits in Ceylon. Flake graphite is preferred. Naturally occurring amorphous graphite, e.g., from metamorphose coal beds deposited in Mexico, and synthetic polycrystalline graphite have not been found to be suitable for use in the present process. The particle size of graphite to be used is not critical although ordinarily particles of from about 10 to 200 mesh (U.S. Standard Sieve) are used for lowest bulk densities. At smaller particle sizes, the apparent bulk density of the final expanded product may be somewhat higher, but still is many times less than that of the unexpanded graphite.

Electrolytes found to be particularly suitable for use in the present process are aqueous acid, ammonium and water soluble metal salt solutions.

Acids particularly suitable are nitric acid, sulfuric acid, hydrobromic acid, phosphoric acid, chromic acid, hydrofluoric acid, perchloric acid, trifluoroacetic acid and mixtures of hydroiodic and hydrochloric acids. These acids can be employed as dilute solutions containing as little as 0.3 weight percent of the acid member. Ordinarily with the aqueous acid electrolyte solutions from about 1 to about 70 weight percent of the acid component and preferably from about 10 to about 50 weight percent acid are employed.

Salts particularly suitable for use as electrolytes in the present process are ammonium, alkali metal and alkaline earth metal salts having nitrate, sulfate, acid sulfate ($HSO_4^-$) bromate, iodate, chlorate, perchlorate, fluoride, bromide, trifluoroacetate or a mixture of iodide and chloride as the anion.

The salt electrolyte concentration can range from about 5 weight percent up to the saturation concentration of the salt in water at the temperature of operation. Ordinarily, salt solutions at or near saturation are employed.

Both acid and salt solutions less dilute than indicated can be employed. However, if the electrolyte solution is too dilute, the conductivity may be detrimentally reduced thereby increasing the electrical power required for acid treating the graphite and adversely affecting the economics of operation.

The concentration of electrolyte solution to be employed in actual operation with a specific electrolyte readily can be determined by one skilled in the art.

Reactors, material handling equipment, material transporting means and the like equipment to be employed are to be constructed of materials that are not detrimentally attacked by the reactants or products and which are operable at the reaction conditions.

The following examples will serve to further illustrate the present invention but are not meant to limit it thereto.

*Example 1.*—About 20 grams of a commercially available No. 1 grade natural flake graphite having a bulk density of about 59.8 pounds per cubic foot was packed into a 25-millimeter diameter by 75-millimeter long porous alumina thimble. The particulate graphite had the following mesh distribution:

| Sieve (U.S. Standard): | Wt. percent |
|---|---|
| +20 | 19.8 |
| 20/30 | 34.7 |
| 30/35 | 25.8 |
| 35/40 | 7.5 |
| 40/50 | 12.2 |

A ¼-inch wide strip of platinum was inserted into the graphite flake mass as an electrode connector. This assembly was connected to the positive pole of a battery and the thimble immersed into a saturated aqueous ammonium nitrate electrolyte solution. A ¼-inch diameter graphite rod was used as a cathode to complete the cell.

The particulate graphite was anodized at a current of 2 amperes at a cell potential of 5.5 volts and electrolyte temperature of about 30° C. The electrolytic reaction was continued for about 15 minutes. During this time the graphite flakes were treated by a quantity of electricity equivalent to about 11.5 ampere-hours per pound of graphite. A sample of the anodized material was removed from the thimble, placed in a nickel beaker and heated to a temperature of about 400° C. The flakes expanded to yield a particulate worm-like mass having an apparent bulk density of about 0.212 gram per cubic centimeter (i.e., about 13.4 pounds per cubic foot).

The remainder of the graphite mass was subjected to further electrolysis, samples being removed at intervals and expanded by heating in a nickel crucible at 400° C. Table I summarizes the apparent bulk densities obtained for the expanded products at various current throughputs.

TABLE I

| Sample No. | Total Current Throughput (Amp-Hrs./lb. graphite) | Expanded Product Apparent Bulk Density (lbs./cu. foot) |
|---|---|---|
| 1 | 11.5 | 13.4 |
| 2 | 23 | 2.8 |
| 3 | 40 | 1.3 |
| 4 | 200 | 0.7 |

A separate sample of this same anodized product which had received a total treatment of 200 ampere hours/pound graphite expanded to provide a product having a bulk density of about 10 lbs./cubic foot when heated at 160° C.

At an expansion temperature of about 200° C. rapid, almost instantaneous expansion of a sample of the electrolyzed material (200 ampere-hours/pound of graphite) into a mass of discrete elongated worm-like particles having an apparent bulk density of about one pound/cubic foot was realized.

*Example 2.*—A number of salt electrolyte solutions were utilized with the apparatus and following the general procedure described in Example 1 in the anodization of various graphites at a number of current throughputs. The electrolysis was conducted at temperatures ranging from about 30 to about 50° C. Cell potentials ranged from about 2.5 volts to about 10 volts. The resulting electrolyzed samples, after separation from the electrolyte, were subjected to heating at a predetermined temperature to provide the vermicular expanded graphite product. Table II summarizes the data and results for a number of runs.

TABLE II

| Run No. | Graphite Charge | | | Electrolyte | | Current Throughput Ampere-hours/lb. Graphite | Expansion Temp., °C. | Expanded Product Bulk Density, lbs./cu. ft. |
|---|---|---|---|---|---|---|---|---|
| | Type | Bulk Density, lbs./cu. ft. | Particle Size (U.S. St'd Sieve) | Type | Soln. Conc. (Wt. percent Solute) | | | |
| 1 | Flake | 59.8 | (¹) | NH₄NO₃ | 11-1 | 45 | 500 | 4.8 |
| 2 | Lump | ~86 | Thru No. 14 | NH₄NO₃ | Sat'd | 160 | 400 | 4.8 |
| 3 | Flake | 59.8 | (¹) | KClO₃ | Sat'd | 30 | 400 | 20.8 |
| 4 | do | 59.8 | (¹) | KClO₃ | Sat'd | 121 | 400 | 5.5 |
| 5 | do | 59.8 | (¹) | KClO₃ | Sat'd | 300 | 400 | 3.6 |
| 6 | do | 59.8 | (¹) | KClO₃ | Sat'd | 480 | 400 | 0.8 |
| 7 | do | 59.8 | (¹) | KClO₃ | Sat'd | 480 | ³ 800–900 | 0.4 |
| 8 | do | 59.8 | (¹) | KHSO₄ | 11.8 | 45 | 500 | 4.6 |
| 9 | do | ~37 | Thru No. 325 | NH₄ClO₄ | Sat'd | 500 | 400 | 1.8 |
| 10 | do | 59.8 | (¹) | (NH₄)₂SO₄ | 11.8 | 360 | 500 | 0.66 |
| 11 | do | 59.8 | (¹) | KBrO₃ | 11.8 | 150 | 500 | 3.66 |
| 12 | do | 59.8 | (¹) | KBrO₃ | 11.8 | 150 | 500 | ² 6.2 |
| 13 | do | 59.8 | (¹) | KF | Sat'd | 128 | 400 | 10.4 |
| 14 | do | 59.8 | (¹) | KBr | Sat'd | 97 | 400 | 7.2 |
| 15 | do | 59.8 | (¹) | CF₃COONa | 10 | 106 | 400 | 3.74 |
| 16 | do | 59.8 | (¹) | KI+KCl | ⁴ 21 | 363 | 400 | 4.2 |

¹ Same mesh distribution as for Example 1.
² Anodized material washed three times with 500 fold excess volumes of water prior to expansion.
³ Contacted with propane torch.
⁴ 20 grams KI and 20 grams KCl per 150 cubic centimeters water.

*Example 3.*—About 5 grams of a commercial No. 1 grade natural graphite having an apparent bulk density of about 59.8 pounds per cubic foot was placed in a 1-inch inside diameter by 3-inch high polytetrafluoroethylene "basket" perforated with 1/16-inch diameter holes. The graphite had a particle size distribution as follows:

| Sieve (U.S. Standard): | Wt. percent |
|---|---|
| +20 | 19.8 |
| 20/30 | 34.7 |
| 30/35 | 25.8 |
| 35/40 | 7.5 |
| 40/50 | 12.2 |

The holder containing the graphite was immersed into an aqueous 70 weight percent nitric acid electrolyte. A ¼-inch diameter carbon rod connected to the positive pole of a variable D.C. voltage rectifier was positioned in contact with the graphite flakes. A second ¼-inch diameter carbon rod served as a cathode completing the cell. The graphite was electrolyzed at cell potentials ranging from 0.9 volt to 4.8 volts at cell currents ranging from 0.5 ampere to 4.0 amperes and electrolysis temperatures of from about 30 to about 80° C.

A sample of electrolyzed graphite flakes was removed from the cell after current passage equivalent to about 30 ampere hours per pound of graphite. This material was placed in a nickel beaker which had been preheated to about 450° C. The graphite flakes expanded to yield a vermicular product having an apparent bulk density of about 0.2 gram/cc. (12.5 pounds per cubic foot).

The electrolytic action was continued on the remainder of the charge until a total current throughput equivalent to about 60 ampere-hours per pound of graphite had been realized. Expansion of a sample of this material resulted by placing it in a preheated crucible at 450° C. The resulting expanded product exhibited an apparent bulk density of about 4.1 pounds per cubic foot.

After the passage of 95 ampere-hours per pound of graphite, a similarly heated sample gave an expanded product of about 1.25 pounds per cubic foot apparent bulk density. Continuing the anodizing treatment until a current passage equivalent to 200 ampere-hours per pound of graphite gave a material which upon heating at 450° C. in the preheated nickel crucible formed a vermicular product having an apparent bulk density of about 0.62 pound per cubic foot.

A sample of this same unexpanded graphite which had been electrolyzed to the 200 ampere-hours per pound of graphite was subjected to direct contact with the flame from a propane torch. The graphite was heated to a temperature of from about 800 to 900° C. whereupon it almost instantaneously expanded into a worm-like product having an apparent bulk density of about 0.1 pound per cubic foot.

In a control test wherein a fresh batch of the same type of graphite flakes was wetted with 70 weight percent $HNO_3$ alone (i.e., without electrolytic action), separated from the acid treating solution and subsequently heated to 450° C. following the expansion technique described for the anodized material, there was no discernible expansion of the so-treated flakes.

In a separate run, about 15 grams of the No. 1 grade natural flake graphite was anodized at 1 ampere current at a potential of about 4.5 volts direct current for 1 hour at a temperature of about 30° C. in an aqueous electroylte containing about 5 weight percent $HNO_3$. This provided an equivalent current throughput of about 35 ampere hours per pound of graphite. The so-treated flakes were heated to about 550° C. in a nickel beaker whereupon the graphite expanded to yield a vermicular product having an apparent bulk density of about 0.066 gram per cubic centimeter (4.15 pounds per cubic foot).

With the nitric acid electrolyte containing about 1.4 weight percent $HNO_3$, anodizing a fresh batch of this same particular graphite at about 30° C. for about 5 hours to a current-time product equivalent to 105 ampere hours at a current range of from 1.5 to 0.5 ampere with subsequent heating of the so-anodized flakes to 400° C. gave an expanded graphite product having an apparent bulk density of about 4.5 pounds per cubic foot.

About 30 grams of crushed Ceylon crystalline lump graphite (passing through a No. 10 U.S. Standard Sieve) was similarly electrolyzed in a 41 weight per cent $HNO_3$ aqueous electrolyte at 3 amperes current for 3½ hours at a temperature of about 30° C. This was equivalent to about 160 ampere-hours per pound of graphite. The anodized particulate graphite product was heated to a temperature of about 400° C. whereupon the particles expanded into the typical worm-like mass. This product exhibited an apparent bulk density of about 2.46 pounds per cubic foot.

Electrolyzing anodically another batch of about 15 grams of the No. 1 graphite flakes in an aqueous 40 weight percent $HNO_3$ electrolyte at a cell potential of about 6 volts over a current range of from about 1 to about 4 amperes for a total current time product of about 500 ampere-hours per pound of graphite at from about 30 to about 50° C. gave a material which vigorously expanded at a temperature of about 400° C. into the typical vermicular product. This expanded material had an apparent bulk density of about 0.12 pound per cubic foot.

Another sample of this same acid treated material was heated to about 220° C. whereupon it expanded rapidly into the typical low bulk density vermicular product.

A number of runs were made utilizing either the "basket" cell assembly described in Example 3 or the "porous alumina thimble" cell assembly reported in Example 1. Various acid electrolytes were employed in these studies using No. 1 flake graphite feed stock of particulation as set forth in Example 1. Data and results of these runs are presented in Examples 4–8 inclusive.

*Example 4.*—About 50 grams of the flake graphite was anodized using as an electrolyte 80 cubic centimeters of concentrated sulfuric acid (98 weight percent $H_2SO_4$) and 200 cubic centimeters of water, i.e., $H_2SO_4$ concentration in the electrolyte of about 42 weight percent, at a current of about 1.5 amperes, a cell potential of about 5 volts, and electrolysis temperature of about 30° C. After about 24 hours of electrolysis (total current-time product of 270 ampere-hours per pound of graphite) the flakes were heated in a nickel crucible to a temperature of about 500° C. The flakes expanded to a vermicular product having an apparent bulk density of about 1.42 pounds per cubic foot.

In a control study, the same type of flake was wetted, without electrolysis, with the 98 weight percent $H_2SO_4$ containing sulfuric acid. Even with this more concentrated acid, there was no visible expansion of the acid treated material upon subsequent heating to about 500° C.

*Example 5.*—About 15 grams of No. 1 grade natural flake graphite was compacted in the porous alumina thimble and anodized in an aqueous 50 weight percent $H_3PO_4$ electrolyte at a temperature of from about 40 to about 50° C., a current of about 1.4 amperes and a cell potential of about 7.7 volts for about 8.5 hours. The total current throughput was equivalent to 360 ampere-hours per pound of graphite. The anodized graphite flakes were heated in a nickel crucible at a temperature of about 550° C. wherein they expanded into product having an apparent bulk density of about 10.5 pounds per cubic foot.

A second batch of the natural flake graphite which had been treated with concentrated phosphoric acid (85 weight percent $H_3PO_4$) without electrolysis did not give any observed expansion when heated at the same temperature in the same manner.

*Example 6.*—About 10 grams of the No. 1 flake graphite was anodized in an electrolyte consisting of about 20 grams of $CrO_3$ dissolved in about 200 cubic centimeters of water. The cell potential was about 3.2 volts and the current was 2 amperes. The total reaction time was about 1 hour at a temperature of about 30° C. This is equivalent to about 85 ampere-hours per pound of graphite. The anodized flakes were expanded by heating in a nickel crucible at a temperature of about 500° C. providing a product having an apparent bulk density of about 13.3 pounds per cubic foot.

*Example 7.*—About 15 grams of a similar No. 1 flake graphite was anodized in a 48 weight percent HBr aqueous electrolyte at from about 30 to about 40° C. at a current range of from about 1 to about 4 amperes for a period of 4.75 hours. The total current input equivalent was about 135 ampere hours per pound of graphite. The so-electrolyzed flakes were heated in a nickel crucible to about 400° C. giving an expanded vermicular product having an apparent bulk density of about 4.5 pound per cubic foot.

*Example 8.*—In an electrolyte consisting of about 50 volume percent trifluoroacetic acid and 50 volume percent water, about 15 grams of the same type of graphite flake material was similarly anodized to a current-time product equivalent to about 60 ampere-hours per pound of graphite. The actual current employed ranged from about 0.6 to about 2 amperes current. Electrolysis was conducted at from about 30 to about 40° C. Heating of the electrolyzed flake to about 400° C. give an expanded graphite product having an apparent bulk density of about 1 pound per cubic foot. Heating an acid treated sample that had not been electrolyzed provided no visible expansion.

*Example 9.*—No. 1 graphite (30 grams) was electrolyzed in a cell operating at about 40° C., and 1 ampere current for about 6 hours. The electrolyte employed consisted of about equal volumes of a mixture of 34 weight percent HCl and about 57 weight percent aqueous HI. The total current throughout was about 91 ampere-hours per pound of graphite. Heating of the anodized product to 400° C. yielded an expanded vermicular product having an apparent bulk density of about 9 pounds per cubic foot.

*Example 10.*—Using an electrolyte consisting of about 49 weight percent aqueous hydrofluoric acid separate charges of about 15 grams of the No. 1 graphite flake were anodized at from about 30 to about 40° C. for various current time products at a cell potential of about 3.75 volts and a current of about 2 amperes; the so-treated material then was expanded at 400° C. The results of various total current inputs upon the density of the final expanded product is presented in Table 3.

TABLE 3

| Amp-hours per pound graphite input | Apparent bulk density of graphite expanded at 400° C. |
|---|---|
| 15 | 4.7 lb./ft.$^3$ |
| 30 | 1.1 lb./ft.$^3$ |
| 180 | 0.3 lb./ft.$^3$ |

In accordance with this process as described for the foregoing examples, water soluble salts wherein the cation is an alkali metal other than described in the examples, alkaline earth metal, earth metal and the like and wherein the anion of such salts is selected from the group set forth hereinbefore can be employed as electrolyte. Salts having as a metal cation calcium, barium, lithium, aluminum, strontium, cesium, rubidium, mercury, zinc, copper, iron, nickel, cobalt and the like readily can be used. The critical feature of the salt electrolyte is that the anion be from the group disclosed herein.

In a manner similar to that described for the foregoing examples it is to be understood that mixtures of the acid electrolytes and mixtures of the salt electrolytes can be employed in the present process over the concentration ranges set forth herein.

Various modifications can be made in the present process without departing from the spirit or scope thereof for it is understood that I limit myself only as defined in the appended claims.

I claim:
1. A process for preparing expanded graphite of low bulk density which comprises;
    (a) anodically electrolyzing a member selected from the group consisting of natural crystalline flake graphite and natural crystalline lump graphite in an aqueous electrolyte solution at an electrolyte temperature of from about 0 to 80° C., a minimum cell potential of about 2 volts and utilizing a quantity of electricity equivalent to from about 10 to about 500 ampere-hours per pound of graphite,
    (b) separating the electrolytically treated graphite from the electrolyte solution, and
    (c) heating said electrolytically treated graphite at a temperature of from about 150 to about 1500° C. thereby to expand said graphite into a product of low bulk density.
2. A process for preparing expanded graphite of low bulk density which comprises;
    (a) anodically electrolyzing a member selected from the group consisting of natural crystalline flake graphite and natural crystalline lump graphite in an aqueous electrolyte at an electrolyte temperature of from about 0 to about 80° C., a cell potential of from about 2 volts to about 10 volts and utilizing a quantity of electricity equivalent to from about 10 to about 500 ampere hours per pound of graphite, said electrolyte being a member selected from the group consisting of aqueous acid, ammonium and water soluble metal salt solutions, said acids being further characterized in that the acid component is a member selected from the group consisting of nitric acid, sulfuric acid, hydrobromic acid, phosphoric acid, chromic acid, hydrofluoric acid, perchloric acid, trifluoroacetic acid and mixtures of hydriodic acid and hydrochloric acid, the concentration of the acid in said electrolyte ranging from about 1 to about 70 weight percent, said salts being further characterized in that they have as an anion a member selected from the group consisting of nitrate, sulfate, acid sulfate, bromate, iodate, chlorate, perchlorate, fluoride, bromide, mixtures of chloride and iodide, and trifluoroacetate and the concentration of said salt electrolyte solution ranging from about 5 weight percent up to the saturation concentration of the salt in water at the temperature of operation,
    (b) separating the electrolytically treated graphite from the electrolyte solution, and
    (c) heating said electrolytically treated graphite at a temperature of from about 150 to about 1500° C. thereby to expand said graphite into a product of low bulk density.
3. A process for preparing expanded graphite of low bulk density which comprises;
    (a) anodically electrolyzing a member selected from the group consisting of natural crystalline flake graphite and natural crystalline lump graphite in an aqueous electrolyte at an electrolyte temperature of from about 20 to about 50° C., a cell potential of from about 2 volts to about 10 volts and utilizing a quantity of electricity equivalent to from about 20 to about 200 ampere-hours per pound of graphite, said electrolyte being a member selected from the group consisting of aqueous acid, ammonium and water soluble metal salt solutions, said acids being further characterized in that the acid component is a member selected from the group consisting of nitric acid, sulfuric acid, hydrobromic acid, phosphoric acid, chromic acid, hydrofluoric acid, perchloric acid, trifluoroacetic acid and mixtures of hydriodic and hydrochloric acid, the concentration of the acid in said electrolyte ranging from about 10 to about 50 weight percent, said salts being further characterized in that they have as an anion a member selected from the group consisting of nitrate, sulfate, acid sulfate, bromate, iodate, chlorate, perchlorate, fluoride, bromide, mixtures of chloride and iodide, and trifluoroacetate and the concentration of said salt electrolyte solution being about the saturation concentration of the salt in water at the temperature of operation,
    (b) separating the electrolytically treated graphite from the electrolyte solution, and
    (c) heating said electrolytically treated graphite at a temperature of from about 200 to about 1000° C. thereby to expand said graphite into a product of low bulk density.
4. A process for preparing expanded graphite of low bulk density which comprises;
    (a) anodically electrolyzing a member selected from the group consisting of natural crystalline flake graphite and natural crystalline lump graphite in an aqueous ammonium nitrate electrolyte at a temperature of from about 30 to about 50° C., a cell potential of about 5 volts and a quantity of electricity equivalent to from about 11 to about 200 ampere-hours per pound of graphite, the concentration of said ammonium nitrate in said electrolyte ranging from about 11 weight percent up to saturation at the temperature of electrolyzing,
    (b) separating the electrolytically treated graphite from the electrolyte solution, and
    (c) heating said electrolytically treated graphite at a temperature of from about 160° C. to about 500° C. thereby to expand said graphite into a product of low bulk density.
5. A process for preparing expanded graphite of low bulk density which comprises;
    (a) anodically electrolyzing a member selected from the group consisting of natural crystalline flake graphite and natural crystalline lump graphite in an aqueous nitric acid electrolyte at a temperature of from about 30 to about 80° C., a cell potential of from 1 to about 5 volts and a quantity of electricity equivalent to from about 30 to about 500 ampere-hours per pound of graphite, the concentration of said nitric acid in said electrolyte ranging from about 1.5 weight percent up to about 70 weight percent $HNO_3$,
(b) separating the electrolytically treated graphite from the electrolyte solution, and
(c) heating said electrolytically treated graphite at a temperature of from about 200° C. to about 900° C. thereby to expand said graphite into a product of low bulk density.

References Cited

UNITED STATES PATENTS 1,191,383   7/1916   Aylsworth _____ 23—209.1 X

OTHER REFERENCES

Mantell: "Industrial Carbon," 2nd ed., D. Van Nostrand Company, Inc., pp. 20–21.

JOHN H. MACK, *Primary Examiner.*

H. M. FLOURNOY, *Assistant Examiner.*